(12) United States Patent
Le et al.

(10) Patent No.: US 10,280,246 B2
(45) Date of Patent: May 7, 2019

(54) METHOD FOR SYNTHESIZING POLYARYLETHERKETONES

(71) Applicant: Arkema France, Colombes (FR)

(72) Inventors: Guillaume Le, Colombelles (FR); Julien Jouanneau, Corneville sur Risle (FR); Jérome Amstutz, Charly (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/415,950

(22) PCT Filed: Jul. 18, 2013

(86) PCT No.: PCT/FR2013/051735
§ 371 (c)(1),
(2) Date: Jan. 20, 2015

(87) PCT Pub. No.: WO2014/013202
PCT Pub. Date: Jan. 23, 2014

(65) Prior Publication Data
US 2015/0183918 A1 Jul. 2, 2015

(30) Foreign Application Priority Data

Jul. 20, 2012 (FR) .................... 12 57068

(51) Int. Cl.
| C08G 8/02 | (2006.01) |
|---|---|
| B29K 61/00 | (2006.01) |
| C08G 61/12 | (2006.01) |
| B29C 64/153 | (2017.01) |
| B29K 261/00 | (2006.01) |
| B29K 461/00 | (2006.01) |
| B29K 661/00 | (2006.01) |

(52) U.S. Cl.
CPC .............. *C08G 8/02* (2013.01); *B29C 64/153* (2017.08); *C08G 61/127* (2013.01); *B29K 2061/00* (2013.01); *B29K 2261/00* (2013.01); *B29K 2461/00* (2013.01); *B29K 2661/00* (2013.01); *B29K 2861/00* (2013.01); *C08G 2261/3442* (2013.01); *C08G 2261/45* (2013.01)

(58) Field of Classification Search
CPC ............ C08G 75/23; C08G 2261/3444; C08G 18/3872; C08G 65/4093
See application file for complete search history.

(56) References Cited

U.S. PATENT DOCUMENTS

| 4,611,033 A | 9/1986 | Maresca |
|---|---|---|
| 4,665,151 A | 5/1987 | Reamey |
| 4,698,393 A | 10/1987 | Jansons |
| 4,716,211 A | 12/1987 | Clendinning |
| 4,816,556 A | 3/1989 | Gay |
| 4,826,947 A | 5/1989 | Jansons |
| 4,841,013 A | 6/1989 | Towle |
| 4,874,840 A | 10/1989 | Becker |
| 4,912,181 A | 3/1990 | Becker |
| 5,081,216 A | 1/1992 | Koch |
| 5,288,834 A | 2/1994 | Roovers et al. |
| 6,090,980 A * | 7/2000 | Nobori .................... C07F 9/065 564/12 |
| 2012/0130042 A1* | 5/2012 | Brunelle ................. C08L 81/06 528/172 |

FOREIGN PATENT DOCUMENTS

| CN | 101802092 A | 8/2010 |
|---|---|---|
| CN | 102015896 A | 4/2011 |
| CN | 102159619 A | 8/2011 |
| WO | 9006957 A1 | 6/1990 |
| WO | 2008136840 A1 | 11/2008 |
| WO | 2009117349 A1 | 9/2009 |
| WO | 2010031844 A1 | 3/2010 |
| WO | 2011004164 | 1/2011 |

OTHER PUBLICATIONS

International Search Report for International Application No. PCT/FR2013/051735 dated Oct. 21, 2013.

\* cited by examiner

*Primary Examiner* — Shane Fang
(74) *Attorney, Agent, or Firm* — RatnerPrestia

(57) ABSTRACT

The invention relates to a process for synthesizing polyaryl ether ketones with low contents of residual materials, whether they are residual monomers or solvents of the synthetic process.

5 Claims, 1 Drawing Sheet

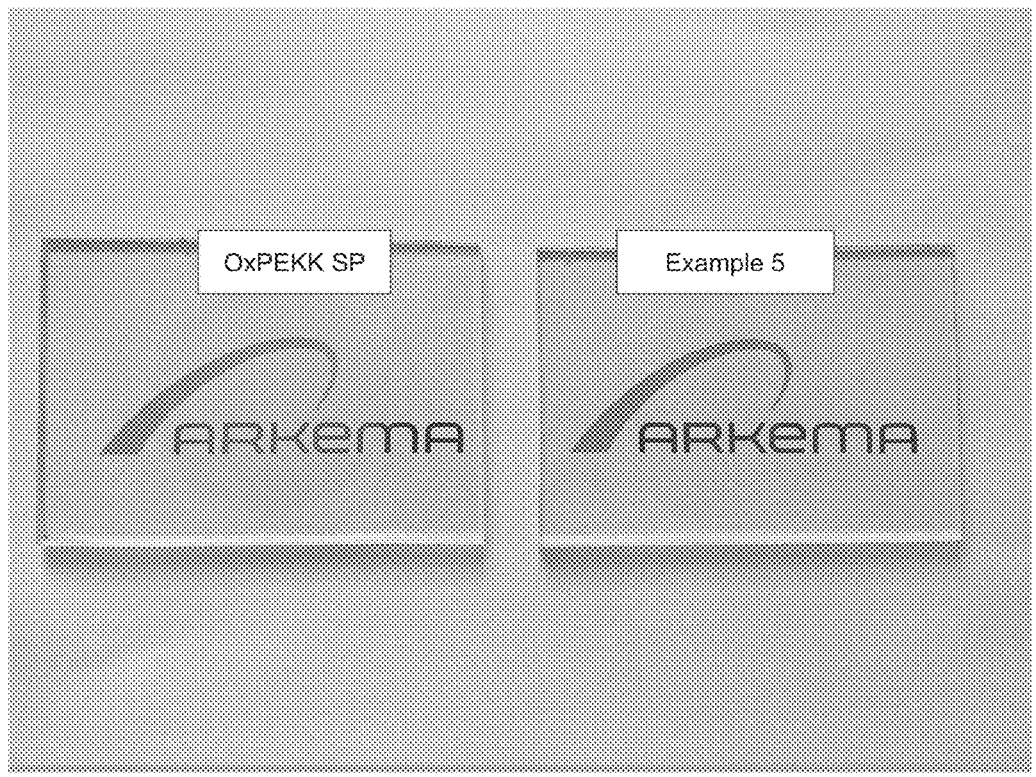

METHOD FOR SYNTHESIZING POLYARYLETHERKETONES

CROSS-REFERENCE TO RELATED APPLICATIONS

This application is a U.S. National Phase filing of International Application No. PCT/FR2013/051735, filed Jul. 18, 2013, which claims priority from French Application No. 12.57068, filed Jul. 20, 2012. The entire disclosure of each of these applications is incorporated herein by reference in its entirety for all purposes.

FIELD OF THE INVENTION

The invention relates to a process for synthesizing polyaryl ether ketones with low contents of residual materials, whether they are residual monomers or solvents of the synthetic process.

BACKGROUND OF THE RELATED ART

Polyaryl ether ketones are well-known high-performance polymers. They are used for applications with temperature or mechanical constraints, or even chemical constraints. These polymers are found in fields as varied as aeronautics, offshore drilling and medical implants. They may be used for all the technologies in which thermoplastics are used, such as molding, compression, extrusion, spinning, dusting or laser prototyping. In the latter case, it is necessary to have a powder of controlled diameter and morphologies, and also low contents of residual products, whether they are monomers or solvents, in order to minimize their deposition onto the various optical members of the prototyping machine. In addition, good heat stability is sought in order to allow the recyclability of the powders in this prototyping process.

Two synthetic routes are used for preparing polyaryl ether ketones. On the one hand is a "nucleophilic substitution" process, for which access to the monomers is difficult since it is necessary to prepare special fluoro or chloro monomers. The synthetic conditions of the nucleophilic substitution process are also difficult (350-400° C. in diphenyl sulfone), and the post-reaction treatments are constraining (difficult removal of the salts and of the solvent).

On the other hand is the "electrophilic substitution" process, which may be performed at either high temperature or room temperature. The advantage of this second process lies in the possibility of polymerizing at moderate temperature (−20° C. to 120° C.), which limits the side reactions. Moreover, both the monomers and the solvents are more industrially available.

The latter process is widely described in the literature, for instance in U.S. Pat. Nos. 4,841,013, 4,816,556, 4,912,181, 4,698,393, WO 95/00446, WO 4 716 211, WO 2011/004 164 or WO 2011/004 164.

The reaction is an electrophilic substitution between one or more aromatic acid chlorides and one or more aromatic ethers in the presence of a Lewis acid. It takes place in a solvent, occasionally in the presence of a dispersant (U.S. Pat. No. 4,698,393, WO 95/00446) and generally takes place in two stages with a first phase at room temperature or even below 0° C., and the reaction is then completed at a temperature of between 0° C. and 120° C. depending on the solvent. The process may also be performed at higher temperature, but this route generates more side reactions. The reaction mixture is then treated with a protic compound to extract all or part of the Lewis acid. The choice of the protic compound depends on the solvent used. In WO 4 841 013 and WO 2011/004 164, U.S. Pat. Nos. 4,716,211, 4,912,181 or WO 2011/004 164, the solvent used is dichloromethane and the protic compound is water. In U.S. Pat. No. 4,716,556 and WO 95/00446, the solvent is ortho-dichlorobenzene and the protic compound is methanol.

It is in point of fact a matter of having sufficient solubility of the protic compound in the solvent so that it can either react with $AlCl_3$ and/or decomplex it from the polymer; for example, water has a solubility in dichloromethane of 0.2% by weight at 20° C.

The Applicant has now discovered that not only is it possible to use a protic compound that is very sparingly soluble in the solvent, but also that this choice makes it possible to obtain a polymer that is more stable when the protic compound is water. In the present invention, the solvent used is aprotic, preferably ortho-dichlorobenzene, but use may also be made of difluorobenzene, trichlorobenzene or a mixture thereof, and the protic compound is water or acidic water, which dissolve in only very low amounts, typically 0.015%, in ortho-dichlorobenzene. The advantage of avoiding the use of an alcohol makes it possible to avoid reactions of the alcohol on the chains of the polyaryl ether ketones and thus to have better stability. In the case of dichloromethane, water is used as protic compound, its action is incomplete since the polymer is obtained in the form of a bulky gel and does not make it possible to be treated correctly with the water within industrially reasonable times without a mechanical treatments that is difficult to perform, or certain additives must be used in order to allow dispersion of the PAEK in the solvent and thus to ensure a sufficiently effective action of water at the end of polymerization. In addition, the proportion of solid (mass of the polymer/mass of solvent) typically used in the invention may be brought to values ranging up to 10%, which is not possible with dichloromethane without being confronted by a bulky gel without use of dispersant. Another advantage consists in using water to perform an azeotropic entrainment of the solvent. A step of finishing by drying under vacuum preferably at 30 mbar at a temperature above the glass transition temperature (Tg) of the polymer, preferably at least 10° C. higher (Tg +10° C.) and more particularly Tg +30° C., Tg measured by DSC, ensures removal of the residual materials, in particular the solvent. The polyaryl ether ketones prepared according to the present invention have very low contents of residual materials and of residual acidity, and may thus be advantageously used in laser sintering processes, minimizing the fouling of optical systems, and with good recyclability.

Although, in document U.S. Pat. No. 4,698,393, use is made of a combination of ortho-dichlorobenzene as solvent and acidic water as protic compound, this treatment step is only partial since it is followed by a second treatment with methanol, which leads subsequently to side reactions. Furthermore, a dispersant is used during the synthesis, which is not the case in the present invention.

SUMMARY OF THE INVENTION

The invention relates to a process for preparing polyaryl ether ketones, which consists of the following steps:
  placing one or more aromatic acid chlorides and one or more aromatic ethers in contact with a Lewis acid in a solvent which dissolves water only to a content of less than 0.05 at 25° C. at a temperature of between −5 and +25° C., with stirring;

completion of the polymerization at a temperature of between 50 and 120° C.;

separation of part of the solvent;

placing the reaction mixture in contact with water with stirring in the optional presence of acid;

separation of the polyaryl ether ketones and of the liquid effluents;

washing of the polyaryl ether ketones with water in the presence or absence of acid and separation of the aqueous liquors;

azeotropic distillation on the polymer containing residual solvent and separation of the aqueous liquors;

washing and neutralization of the acidity of the effluents and of the PAEK particles and separation of the aqueous liquors;

drying of the polyaryl ether ketones at a temperature above Tg +20° C.

BRIEF DESCRIPTION of the DRAWING:

The figure shows a photograph comparing the deposits from OxPEK to those of Example 5.

DETAILED DESCRIPTION

The process of the invention is applicable to any combination of aromatic acid dichlorides and of aromatic ether acid monochlorides and/or of aromatic biphenyls.

Preferably, the acid chlorides will be chosen from terephthaloyl chloride (TCl) and isophthaloyl chloride (ICl) or a mixture thereof, in proportions such that in the final PAEK structure, there is a ratio of para-diketophenyl/meta-diketophenyl units of from 100% to 50%, preferably from 85% to 55% and more particularly from 82% to 60%.

The acid monochlorides will be chosen from benzoyl chloride and benzenesulfonyl chloride.

Preferably, the aromatic ethers or the aromatic biphenyls that follow will be chosen:

1,4-(phenoxybenzoyl)benzene (EKKE), diphenyl ether, biphenyl, 4-phenoxybenzophenone, 4-chlorobiphenyl, 4-(4-phenoxyphenoxy)benzophenone and biphenyl 4-benzenesulfonylphenyl phenyl ether.

The polyaryl ether ketones, also known as PAEK, prepared according to the invention correspond to the following formula:

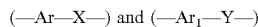

in which:

Ar and $Ar_1$ each denote a divalent aromatic radical;

Ar and $Ar_1$ may be chosen, preferably, from 1,3-phenylene, 1,4-phenylene, 4,4'-biphenylene, 1,4-naphthylene, 1,5-naphthylene and 2,6-naphthylene;

X denotes an electron-withdrawing group; it may be preferably chosen from a carbonyl group and a sulfonyl group, Y denotes a group chosen from an oxygen atom, a sulfur atom and an alkylene group such as —$CH_2$— and isopropylidene.

In these units, at least 50%, preferably at least 70% and more particularly at least 80% of the groups X are a carbonyl group, preferably at least 70% and more particularly at least 80% of the groups Y represent an oxygen atom.

According to a preferred embodiment, 100% of the groups X denote a carbonyl group and 100% of the groups Y represent an oxygen atom.

More preferentially, the polyaryl ether ketone (PAEK) may be chosen from:

a polyether ether ketone, also known as PEEK, comprising units of formula I:

Formula I a polyether ketone, also known as PEK, comprising units of formula II:

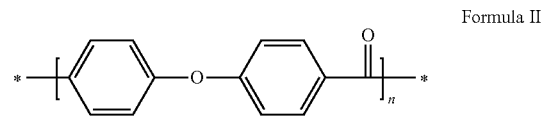

Formula II a polyether ketone ketone, also known as PEKK, comprising units of formula IIIA, of formula IIIB and a mixture thereof:

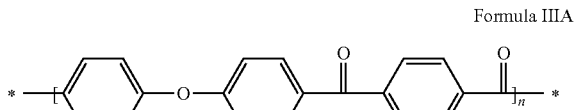

Formula IIIA

Formula IIIB

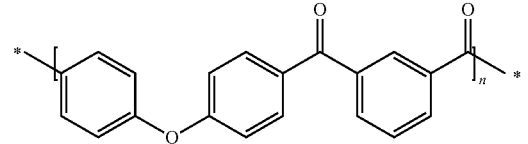

and a polyether ether ketone ketone, also known as PEEKK, comprising units of formula IV:

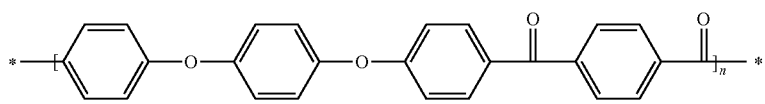

Formula IV but other arrangements of the carbonyl group and of the oxygen atom are also possible.

During the synthesis of these polyaryl ether ketones, the following Lewis acids will be used: anhydrous aluminum trichloride, anhydrous aluminum tribromide, antimony pentachloride or pentafluoride, indium trichloride, gallium trichloride, boron trichloride, boron trifluoride, zinc, iron or tin chloride, titanium tetrachloride and molybdenum pentachloride. It is preferably aluminum trichloride, and more particularly anhydrous aluminum trichloride.

The solvents used will be solvents for the monomers and non-solvents for the polymer, which dissolve water to a content <0.2% and preferably <0.05%. The solvent is preferably ortho-dichlorobenzene.

The synthetic process may be performed in a reactor or a succession of several reactors.

Preferably, the synthetic process is performed in three reactor is placed vertically or horizontally. The first reactor is maintained at a temperature of between −20° C. and +40° C., preferably between −5 and +20° C. and more preferably between −5 and +5° C. It contains all or part of the monomer mixture, typically between 10% and 100% of the total monomer charge, preferably between 80% and 100% in the solvent and between 0 and 100% and preferably between 80% and 100% by weight of the Lewis acid charge, the remainders of the monomer charge and the Lewis acid charge being in reactor 2.

Reactor 2 is maintained at a temperature of between 50 and 120° C. and preferably between 50 and 90° C.

The residence times are adapted such that the conversion is maximized at the outlet of reactor 2.

The third reactor contains water, 10% to 50% by weight of the reaction mass, supplemented with 0 to 4% of pure hydrochloric acid. The reaction mixture is poured therein, with stirring at between 15 and 90° C. and preferably between 15 and 30° C., and this stirring is maintained for at least one hour. According to one variant, the aqueous phase may also be added to reactor 3 after the reaction phase has been introduced therein.

The reaction mixture resulting from reactor 3 is separated from the majority of the liquors by a suitable separator.

The liquors are subjected to a suitable treatment such as decantation in order to upgrade the solvent after distillation, and mild removal of the aqueous effluents in industrially suitable upgrading or removal devices.

The remaining part derived from the separation step described previously (polymer and solvent) is subjected to an azeotropic distillation, which allows good removal of the solvent from the polymer and upgrading of this solvent.

The polymer mass in aqueous suspension is then subjected to several additional washing/neutralization steps with water or acidic water followed by a step of treatment with a base such as sodium hydroxide or 0.5 N aqueous ammonia, and then separation.

Finally, a step of drying the polymer is performed at a temperature>Tg +20° C. at 30 mbar.

The product obtained has a residual content of solvent of less than 100 ppm and a residual aromatic ether content of less than 1% (the term "residual aromatic ether" means compounds of molar mass<500 g·mol$^{-1}$: EKKE=470 g/mol).

It shows very good thermal stability evaluated by the virtual constancy of the inherent viscosity in solution measured in 96% sulfuric acid according to standard ISO 307 following a treatment at 280° C. for 24 hours under nitrogen, typically less than 2% of variation in viscosity between the starting powder and the product after 24 hours of treatment.

The product is obtained in the form of coarse particles, to which may be added an agent for facilitating the flow such as silica, in small amounts, typically <0.1% by weight.

It may be used in a process for molding an object by means of electromagnetic radiation (especially laser), consisting in irradiating the powder layer by layer, along a determined line, so as to locally melt the polyaryl ether ketone and obtain said object.

Example 1

The content of residual organic solvent is evaluated by gas chromatography according to the following protocol:
Sample Preparation Protocols
Extraction with dichloromethane by sonication for 20 minutes:
Sw=20 mg-50 mg of sample
0.9 ml dichloromethane
0.1 ml of internal standard (pentadecane) dissolved in dichloromethane.
GC operating conditions: Varian 3800 with CP8400 autosampler
Column: BPX35 L=32 m; ID=0.25 mm; Film=1 μm
Flow rate (constant mode)=1.3 ml/min
FID detector temperature: 300° C.
Injector temperature 1177: 250° C.
Split ratio=25
Oven temperature program: 40° C. (2 min)→280° C. (2 min) at 8° C./min
Injection mode: autosampler
Injection volume=1 μl
Carrier gas: helium Example 2

Protocol for Measuring the Residual Aromatic Ethers:
The samples are dissolved in a BTF/HFIP mixture in the presence of an internal standard.
All the analyses were performed on a Varian® 3800 GC machine equipped with a 1041 on-column injector and an FID detector.
Column: MXT 500 Sim Dist 6 m/320 μm/ef=0.15 μm
Det. temperature (FID)=400° C.
1041 injector temperature=set at T≤40° C.
Column flow rate (constant flow)=3 ml/min
Oven program=40° C. (2 min)→150° C. at 8° C./min
150° C. (0 min)→330° C. (0 min) at 15° C./min
330° C. (0 min)→360° C. (5 min) at 25° C./min
Carrier gas=helium
Injection mode: into the column with the injection point located in the part regulated by the oven.
Volume injected=0.5 μl Example 3

Comparative Example—Treatment with MeOH

Ortho-dichlorobenzene (1600 g) and EKKE (65 g) are placed in a 2 L reactor equipped with a stirrer, under a stream of dry nitrogen. The acid chlorides are then added: terephthaloyl chloride (5.4 g), isophthaloyl chloride (22.2 g) and benzoyl chloride (0.38 g). The reactor is then cooled to −5° C. AlCl$_3$ (115 g) is then added while keeping the temperature in the reactor below 5° C. After a homogenization period (about 10 minutes), the reactor temperature is raised by 5° C. per minute up to 90° C. The polymerization starts during this temperature increase. The reactor is maintained for 30 minutes at 90° C. and then cooled to 30° C. 400 g of methanol are then added slowly so as not to exceed a temperature of 60° C. in the reactor. The reactor is stirred for 2 hours and then cooled to 30° C.

The reaction medium is then removed from the reactor and a first filtration is performed on a sinter, in which part of the solvent is thus removed from the PEKK. The wet PEKK is then rinsed on the sinter with 300 g of MeOH, it is then placed in a beaker with 700 g of MeOH and is stirred for 2 hours. A further filtration on a sinter is performed and the PEKK is a gain rinsed with 300 g of MeOH. The wet PEKK is then placed in a beaker with 750 g of an aqueous HCl solution at 3.3% by mass and is stirred for 2 hours. A further filtration on a sinter is performed and the PEKK is then rinsed with 450 g of water. It is then placed in a beaker with 400 g of 0.5 N sodium hydroxide solution and is stirred for 2 hours. The product after filtration is then washed several times with demineralized water in order to remove the excess sodium hydroxide.

The product is then dried at 180° C. for 12 hours in a vacuum oven.

A PEKK with a viscosity in solution in sulfuric acid of 0.87 dl/g is obtained.

After suitable grinding, the powder obtained is placed in a tube under a stream of nitrogen heated to 280° C. for 24 hours. The powder then undergoes another viscosity analysis in solution, and a viscosity of 0.90 dl/g is found.

Example 4 (Comparative)

Comparative Example—Treatment with Water, Washing with Methanol

Ortho-dichlorobenzene (1600 g) and EKKE (65 g) are placed in a 2 L reactor with stirring, under a stream of dry nitrogen. The acid chlorides are then added: terephthaloyl chloride (5.4 g), isophthaloyl chloride (22.2 g) and benzoyl chloride (0.38 g). The reactor is then cooled to −5° C. AlCl$_3$ (115 g) is then added while keeping the temperature in the reactor below 5° C. After a homogenization period (about 10 minutes), the reactor temperature is raised at 5° C. per minute up to 90° C. The polymerization starts during this temperature increase. The reactor is maintained at 90° C. for 30 minutes and then cooled to 30° C. 400 g of acidic water (3% HCl) is then added slowly so as not to exceed a temperature of 60° C. in the reactor. The reactor is stirred for 2 hours and then cooled to 30° C.

The filtration, washing and drying steps are similar to those of Example 3.

A PEKK with a viscosity in solution in sulfuric acid of 0.84 dl/g is obtained.

After suitable grinding, the powder obtained is placed in a tube under a stream of nitrogen heated to 280° C. for 24 hours. The powder then undergoes another viscosity analysis in solution, and a viscosity of 0.89 dl/g is found.

Example 5 (Invention)

Comparative Example—Treatment with Water, Azeotropic Distillation and Washing with Water The synthetic steps of this example are similar to that of Example 4.

The reaction medium is then removed from the reactor and a first filtration is performed on a sinter. The wet PEKK is then placed in a 2 L reactor equipped with Dean-Stark apparatus and containing 800 g of water. About 600 g of a mixture of water and solvent are removed by azeotropic distillation at 98° C., and the remainder is filtered on a sinter. The wet PEKK thus recovered is then placed in a beaker with 700 g of an aqueous 3% HCl solution and is stirred for 2 hours. A further filtration is performed and the washing-filtration operation is performed a second time, then the wet PEKK is then rinsed on the filter with 450 g of water. It is then placed in a beaker with 400 g of 0.5 N sodium hydroxide solution and is stirred for 2 hours. The product after filtration is then washed several times with demineralized water in order to remove the excess sodium hydroxide.

The product is then dried at 180° C. for 12 hours in a vacuum oven.

A PEKK with a viscosity in solution in sulfuric acid of 0.97 dl/g is obtained.

After suitable grinding, the powder obtained is placed in a tube under a stream of nitrogen heated to 280° C. for 24 hours. The powder then undergoes another viscosity analysis in solution, and a viscosity of 0.96 dl/g is found.

|  |  | Inherent viscosity at t0 | Inherent viscosity after 24 h at 280° C. | Change in inherent viscosity |
|---|---|---|---|---|
| Example 3 | treatment and washing with methanol | 0.87 | 0.90 | +3.4% |
| Example 4 | treatment with water and washing with methanol | 0.84 | 0.89 | +5.9% |
| Example 5 (invention) | treatment with water and azeotropic distillation and washing with water | 0.97 | 0.96 | −1% |

Example 6

Product A, OxPEKK SP: manufacturing process using methanol, characterized by a residual methanol content measured by NMR of 0.1%, a residual ortho-dichlorobenzene content measured (by GC) of 0.7% and a residual EKKE content measured by GC of 1.13%.

Product B: manufacturing process of Example 5. No methanol detected, residual ortho-dichlorobenzene content<100 ppm and residual EKKE content measured by GC of 0.28%.

10 g of PEKK powder are placed in a cylindrical glass crucible (diameter=5 cm and height=7 cm). A glass plate (length=7 cm and height=0.4 cm) is placed on this glass crucible. The crucible is then placed in a cylindrical electric oven and the powder is maintained at 285° C. for 8 hours. During this heating, the volatile matter sublimes off and/or condenses on the glass plate cooled at the top by the ambient air.

In the figure it is seen that, in the case of OxPEKK SP, there are many more deposits than in the case of the PEKK of Example 5.

The invention claimed is:

1. A process for preparing a polyaryl ether ketone (PAEK), which comprises the following consecutive steps:
   a) placing one or more aromatic acid chlorides and one or more aromatic ethers in contact with a Lewis acid in a solvent which has a water solubility of less than 0.05% at 25° C. at a temperature of between −5 and +25° C., with stirring;
   b) carrying out a polymerization of the aromatic acid chlorides and aromatic ethers and completing the polymerization at a temperature of between 50 and 120° C. to provide a reaction mixture which includes a polyaryl ether ketone;
   c) placing the reaction mixture in contact with water in the absence of alcohol with stirring in the optional presence of acid to extract the Lewis acid, forming a mixture of polyaryl ether ketone and liquid effluents;

d) separating the polyaryl ether ketone from the liquid effluents;

e) performing azeotropic distillation on the polyaryl ether ketone so as to eliminate residual solvent;

f) washing the polyaryl ether ketone;

g) drying the polyaryl ether ketone at a temperature above Tg+20° C.

2. The process as claimed in claim 1, in which the polyaryl ether ketone is a polyether ketone ketone (PEKK).

3. The process as claimed in claim 2, in which the aromatic ether is 1,4-bis(4-phenoxybenzoyl)benzene.

4. The process as claimed in claim 2, in which the acid chlorides are chosen from terephthaloyl chloride and isophthaloyl chloride or a mixture thereof.

5. The process as claimed in claim 1, in which the solvent is ortho-dichlorobenzene.

* * * * *